United States Patent
Zheng et al.

(10) Patent No.: US 11,488,386 B1
(45) Date of Patent: Nov. 1, 2022

(54) METHOD TO GENERATE MODELS FOR TESTING AND TRAINING IN A RETAIL ENVIRONMENT FOR A CAMERA SIMULATION SYSTEM

(71) Applicant: AiFi Corp, Santa Clara, CA (US)

(72) Inventors: Ying Zheng, Santa Clara, CA (US); Steve Gu, Santa Clara, CA (US); Brian Bates, Santa Clara, CA (US); Long Chen, Santa Clara, CA (US); Will Hendry, Santa Clara, CA (US); Juan Terven, Santa Clara, CA (US); Joao Falcao, Santa Clara, CA (US); Tyler Crain, Santa Clara, CA (US)

(73) Assignee: AiFi Corp, Santa Clara, CA (US)

( * ) Notice: Subject to any disclaimer, the term of this patent is extended or adjusted under 35 U.S.C. 154(b) by 0 days.

(21) Appl. No.: 17/352,301

(22) Filed: Jun. 20, 2021

(51) Int. Cl.
*G06V 20/52* (2022.01)
*G06T 17/00* (2006.01)

(52) U.S. Cl.
CPC .............. *G06V 20/52* (2022.01); *G06T 17/00* (2013.01); *G06T 2200/04* (2013.01); *G06T 2200/08* (2013.01)

(58) Field of Classification Search
CPC ..... G06V 20/52; G06T 17/00; G06T 2200/04; G06T 2200/08
See application file for complete search history.

(56) References Cited

U.S. PATENT DOCUMENTS

| | | | |
|---|---|---|---|
| 10,347,009 B1 * | 7/2019 | Terven | G06N 3/0454 |
| 10,636,173 B1 * | 4/2020 | Beach | G06V 10/751 |
| 10,827,116 B1 * | 11/2020 | Terven | G06K 9/627 |
| 2018/0091704 A1 * | 3/2018 | Koyama | H04N 13/243 |
| 2019/0058870 A1 * | 2/2019 | Rowell | H04N 9/8227 |
| 2021/0329165 A1 * | 10/2021 | Liu | H04N 5/247 |

* cited by examiner

*Primary Examiner* — Michael Le
(74) *Attorney, Agent, or Firm* — Jun Liu

(57) ABSTRACT

This application relates to systems, methods, devices, and other techniques that can be utilized to generate models for a camera system simulation in a retail environment and perform simulation to perfect these models.

5 Claims, 3 Drawing Sheets

---

Obtaining a first visual camera system setting for a first visual camera system, wherein the first visual camera system comprises a set of visual cameras, wherein the first visual camera system setting comprises number of the set of visual cameras, camera position data, camera orientation, camera movement data and camera lens characteristics data, wherein the first visual camera system setting is determined by a manually designed setting, wherein the first visual camera system setting considers factors that comprise possibility of blind spots, number of cameras that are needed to cover certain points, shop areas that cameras cannot be placed due to physical restriction 105

↓ simulating the virtual rendering system using the first visual camera system setting to correspondingly control the first virtual camera system in a virtual environment, wherein the virtual environment comprises virtual objects corresponding to real objects in a real environment, wherein the real environment is configured to be a retail store 110

↓ obtaining, from the virtual rendering system, a first virtually rendered three-dimensional feed of the virtual environment and the virtual objects using the first virtual camera system 115

↓ tuning the first visual camera system setting to a second visual camera system setting to achieve a second virtually rendered three-dimensional feed of the virtual environment and the virtual objects using the first virtual camera system, wherein the second virtually rendered three-dimensional feed has better coverage and accuracy for the virtual environment and the virtual objects 120

↓ installing a real-world camera system based on the second visual camera system setting in the real environment 125

100

Obtaining a first visual camera system setting for a first visual camera system, wherein the first visual camera system comprises a set of visual cameras, wherein the first visual camera system setting comprises number of the set of visual cameras, camera position data, camera orientation, camera movement data and camera lens characteristics data, wherein the first visual camera system setting is determined by a manually designed setting, wherein the first visual camera system setting considers factors that comprise possibility of blind spots, number of cameras that are needed to cover certain points, shop areas that cameras cannot be placed due to physical restriction 105

↓ simulating the virtual rendering system using the first visual camera system setting to correspondingly control the first virtual camera system in a virtual environment, wherein the virtual environment comprises virtual objects corresponding to real objects in a real environment, wherein the real environment is configured to be a retail store 110

↓ obtaining, from the virtual rendering system, a first virtually rendered three-dimensional feed of the virtual environment and the virtual objects using the first visual camera system 115

↓ tuning the first visual camera system setting to a second visual camera system setting to achieve a second virtually rendered three-dimensional feed of the virtual environment and the virtual objects using the first visual camera system, wherein the second virtually rendered three-dimensional feed has better coverage and accuracy for the virtual environment and the virtual objects 120

↓ installing a real-world camera system based on the second visual camera system setting in the real environment 125

100

FIG. 1

METHOD TO GENERATE MODELS FOR TESTING AND TRAINING IN A RETAIL ENVIRONMENT FOR A CAMERA SIMULATION SYSTEM

BACKGROUND OF THE INVENTION

This application relates to systems, methods, devices, and other techniques that can be utilized to generate models for a camera system simulation in a retail environment and perform simulation to perfect these models.

Methods and apparatus to generate models for testing and training neural networks in a retail store to monitor products and customers are in practice. However, generating models by visual reality platforms within a retail environment is new. Furthermore, these techniques and methods can be combined with recently developed artificial intelligence and machine learning and make the purchase process more accurate and efficient.

This application relates to systems, methods, devices, and other techniques that can be utilized to generate models for a camera system simulation in a retail environment and perform simulation to perfect these models.

SUMMARY OF THE INVENTION

In some embodiments, the invention is related to a method for simulating and generating visual camera views within a virtual rendering system, the method comprising: Obtaining a first visual camera system setting for a first visual camera system, wherein the first visual camera system comprises a set of visual cameras, wherein the first visual camera system setting comprises number of the set of visual cameras, camera position data, camera orientation, camera movement data and camera lens characteristics data, wherein the first visual camera system setting is determined by a manually designed setting, wherein the first visual camera system setting considers factors that comprise possibility of blind spots, number of cameras that are needed to cover certain points, shop areas that cameras cannot be placed due to physical restriction; simulating the virtual rendering system using the first visual camera system setting to correspondingly control the first virtual camera system in a virtual environment, wherein the virtual environment comprises virtual objects corresponding to real objects in a real environment, wherein the real environment is configured to be a retail store; obtaining, from the virtual rendering system, a first virtually rendered three-dimensional feed of the virtual environment and the virtual objects using the first virtual camera system; tuning the first visual camera system setting to a second visual camera system setting to achieve a second virtually rendered three-dimensional feed of the virtual environment and the virtual objects using the first virtual camera system, wherein the second virtually rendered three-dimensional feed has better coverage and accuracy for the virtual environment and the virtual objects; and installing a real-world camera system based on the second visual camera system setting in the real environment. In some embodiments, physical restriction comprises lamps.

In some embodiments, the present inventions are related to a method for simulating and generating visual camera views within a virtual rendering system, the method comprising: Obtaining a first visual camera system setting for a first visual camera system, wherein the first visual camera system comprises a set of visual cameras, wherein the first visual camera system setting comprises number of the set of visual cameras, camera position data, camera orientation, camera movement data and camera lens characteristics data, wherein the first visual camera system setting is determined by a manually designed setting, wherein the first visual camera system setting considers factors that comprise possibility of blind spots, number of cameras that are needed to cover certain points, shop areas that cameras cannot be placed due to physical restriction; simulating the virtual rendering system using the first visual camera system setting to correspondingly control the first virtual camera system in a virtual environment, wherein the virtual environment comprises virtual objects corresponding to real objects in a real environment, wherein the real environment is configured to be a retail store; obtaining, from the virtual rendering system, a first virtually rendered three-dimensional feed of the virtual environment and the virtual objects using the first virtual camera system; tuning the first visual camera system setting to a second visual camera system setting to achieve a second virtually rendered three-dimensional feed of the virtual environment and the virtual objects using the first virtual camera system, wherein the second virtually rendered three-dimensional feed has better coverage and accuracy for the virtual environment and the virtual objects; tuning the second visual camera system setting to a third visual camera system setting to optimize three-dimensional feed of the virtual environment and the virtual objects; and installing a real-world camera system based on the third visual camera system setting in the real environment. In some embodiments, physical restriction comprises lamps.

In some embodiments, the method comprises a method for simulating and generating visual camera views within a virtual rendering system, the method comprising: obtaining a first visual camera system setting for a first visual camera system, wherein the first visual camera system comprises a set of visual cameras, wherein the first visual camera system setting comprises number of the set of visual cameras, camera position data, camera orientation, camera movement data and camera lens characteristics data, wherein the first visual camera system setting is determined by a manually designed setting, wherein the first visual camera system setting considers factors that comprise possibility of blind spots, number of cameras that are needed to cover certain points, shop areas that cameras cannot be placed due to physical restriction; simulating the virtual rendering system using the first visual camera system setting to correspondingly control the first virtual camera system in a virtual environment, wherein the virtual environment comprises virtual objects corresponding to real objects in a real environment, wherein the real environment is configured to be a retail store; obtaining, from the virtual rendering system, a first virtually rendered three-dimensional feed of the virtual environment and the virtual objects using the first virtual camera system; tuning the first visual camera system setting to a second visual camera system setting to achieve a second virtually rendered three-dimensional feed of the virtual environment and the virtual objects using the first virtual camera system, wherein the second virtually rendered three-dimensional feed has better coverage and accuracy for the virtual environment and the virtual objects; installing a real-world camera system based on the second visual camera system setting in the real environment; capturing, from a video capture system, a first video-captured three-dimensional feed of the retail store; rendering the composite three-dimensional render by processing the second virtually rendered three-dimensional feed and the first video-captured three-dimensional feed; outputting the composite three-dimensional render to a three-dimensional display; and training an artificial intelligence system based on the composite three-dimensional render.

These and other aspects, their implementations and other features are described in detail in the drawings, the description and the claims.

BRIEF DESCRIPTION OF THE DRAWINGS

FIG. 1 shows an example of a method for simulating and generating visual camera views within a virtual rendering system.

DETAILED DESCRIPTION OF THE INVENTION

FIG. 1 shows an example of a method for simulating and generating visual camera views within a virtual rendering system.

In some embodiments, the invention is related to a method 100 for simulating and generating visual camera views within a virtual rendering system, comprising a step 105 of obtaining a first visual camera system setting for a first visual camera system, wherein the first visual camera system comprises a set of visual cameras, wherein the first visual camera system setting comprises number of the set of visual cameras, camera position data, camera orientation, camera movement data and camera lens characteristics data, wherein the first visual camera system setting is determined by a manually designed setting, wherein the first visual camera system setting considers factors that comprise possibility of blind spots, number of cameras that are needed to cover certain points, shop areas that cameras cannot be placed due to physical restriction.

In some embodiments, the invention is related to a method 100 for simulating and generating visual camera views within a virtual rendering system, comprising a step 110 of simulating the virtual rendering system using the first visual camera system setting to correspondingly control the first virtual camera system in a virtual environment, wherein the virtual environment comprises virtual objects corresponding to real objects in a real environment, wherein the real environment is configured to be a retail store.

In some embodiments, the invention is related to a method 100 for simulating and generating visual camera views within a virtual rendering system, comprising a step 115 of obtaining, from the virtual rendering system, a first virtually rendered three-dimensional feed of the virtual environment and the virtual objects using the first virtual camera system;

In some embodiments, the invention is related to a method 100 for simulating and generating visual camera views within a virtual rendering system, comprising a step 120 of tuning the first visual camera system setting to a second visual camera system setting to achieve a second virtually rendered three-dimensional feed of the virtual environment and the virtual objects using the first virtual camera system, wherein the second virtually rendered three-dimensional feed has better coverage and accuracy for the virtual environment and the virtual objects.

In some embodiments, the invention is related to a method 100 for simulating and generating visual camera views within a virtual rendering system, comprising a step 125 of installing a real-world camera system based on the second visual camera system setting in the real environment.

In some embodiments, the first set of annotations comprise transparency of a group of products.

In some embodiments, physical restriction comprises lamps.

Figure 2:
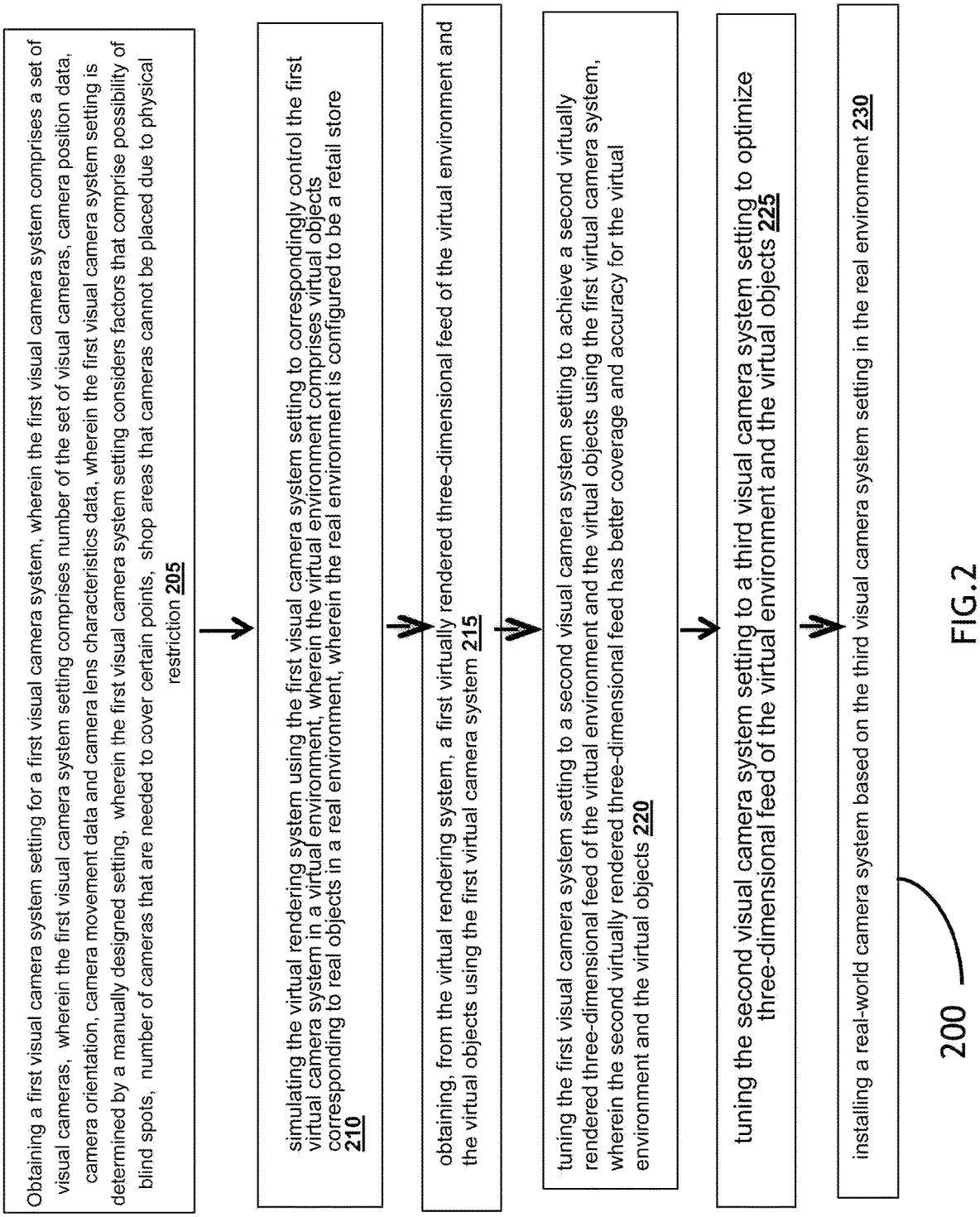
FIG. 2 shows an example of another method for simulating and generating visual camera views within a virtual rendering system.

FIG. 2 shows an example of another method 200 for simulating and generating visual camera views within a virtual rendering system.

In some embodiments, the method comprises a step 205 of obtaining a first visual camera system setting for a first visual camera system, wherein the first visual camera system comprises a set of visual cameras, wherein the first visual camera system setting comprises number of the set of visual cameras, camera position data, camera orientation, camera movement data and camera lens characteristics data, wherein the first visual camera system setting is determined by a manually designed setting, wherein the first visual camera system setting considers factors that comprise possibility of blind spots, number of cameras that are needed to cover certain points, shop areas that cameras cannot be placed due to physical restriction.

In some embodiments, the method comprises a step 210 of simulating the virtual rendering system using the first visual camera system setting to correspondingly control the first virtual camera system in a virtual environment, wherein the virtual environment comprises virtual objects corresponding to real objects in a real environment, wherein the real environment is configured to be a retail store.

In some embodiments, the method comprises a step 215 of obtaining, from the virtual rendering system, a first virtually rendered three-dimensional feed of the virtual environment and the virtual objects using the first virtual camera system.

In some embodiments, the method comprises a step 220 of tuning the first visual camera system setting to a second visual camera system setting to achieve a second virtually rendered three-dimensional feed of the virtual environment and the virtual objects using the first virtual camera system, wherein the second virtually rendered three-dimensional feed has better coverage and accuracy for the virtual environment and the virtual objects;

In some embodiments, the method comprises a step 225 of tuning the second visual camera system setting to a third visual camera system setting to optimize three-dimensional feed of the virtual environment and the virtual objects In some embodiments, the method comprises a step 230 of installing a real-world camera system based on the third visual camera system setting in the real environment.

In some embodiments, physical restriction comprises lamps.

Figure 3:
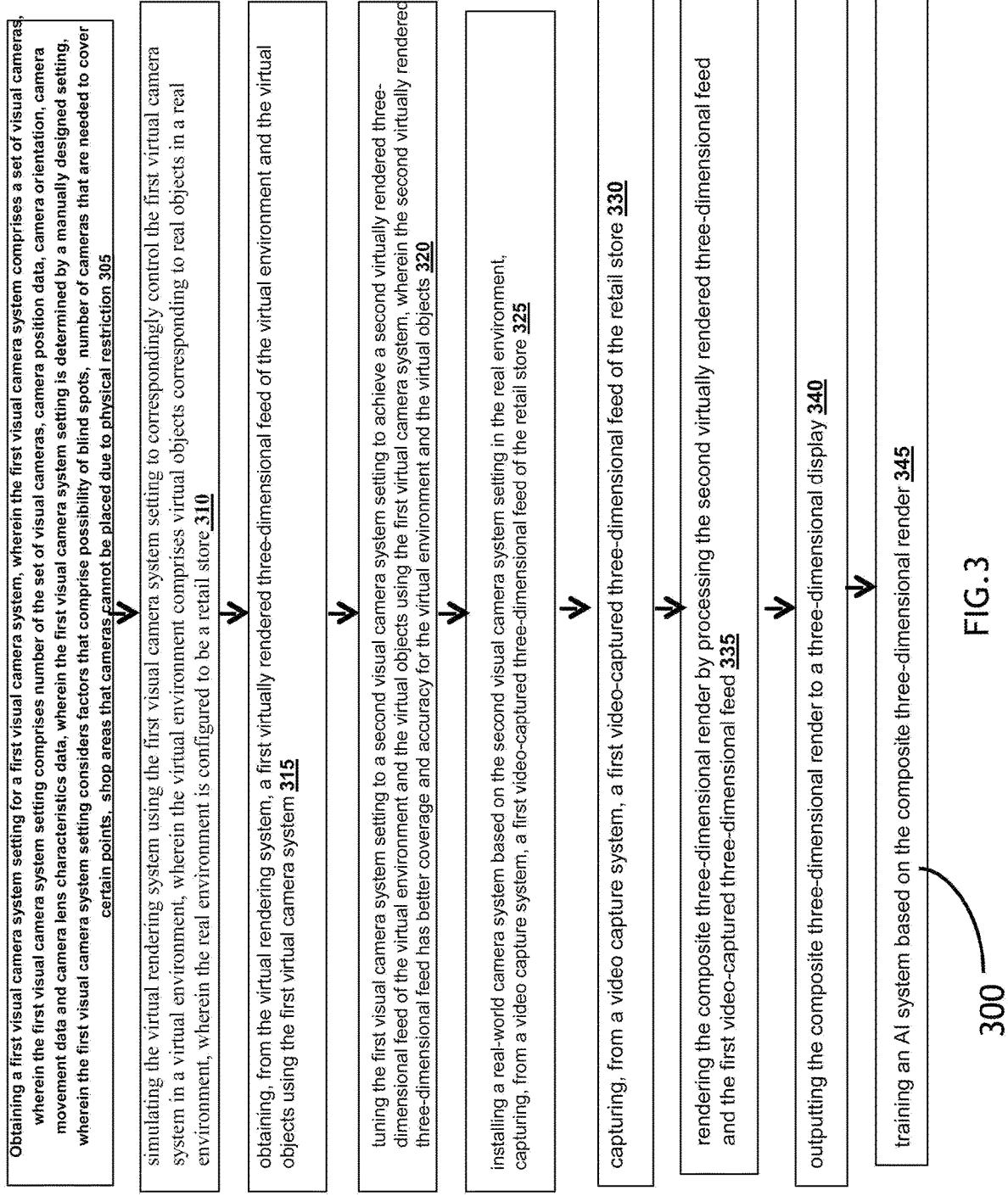
FIG. 3 shows another example of a third method for simulating and generating visual camera views within a virtual rendering system.

FIG. 3 shows another example of a third method 300 for simulating and generating visual camera views within a virtual rendering system.

In some embodiments, the method comprises a step 305 of obtaining a first visual camera system setting for a first visual camera system, wherein the first visual camera system comprises a set of visual cameras, wherein the first visual camera system setting comprises number of the set of visual cameras, camera position data, camera orientation, camera movement data and camera lens characteristics data, wherein the first visual camera system setting is determined by a manually designed setting, wherein the first visual camera system setting considers factors that comprise possibility of blind spots, number of cameras that are needed to cover certain points, shop areas that cameras cannot be placed due to physical restriction.

In some embodiments, the method comprises a step 310 of simulating the virtual rendering system using the first visual camera system setting to correspondingly control the first virtual camera system in a virtual environment, wherein the virtual environment comprises virtual objects corresponding to real objects in a real environment, wherein the real environment is configured to be a retail store.

In some embodiments, the method comprises a step 315 of obtaining, from the virtual rendering system, a first virtually rendered three-dimensional feed of the virtual environment and the virtual objects using the first virtual camera system.

In some embodiments, the method comprises a step 320 of tuning the first visual camera system setting to a second visual camera system setting to achieve a second virtually rendered three-dimensional feed of the virtual environment and the virtual objects using the first virtual camera system, wherein the second virtually rendered three-dimensional feed has better coverage and accuracy for the virtual environment and the virtual objects.

In some embodiments, the method comprises a step 325 of installing a real-world camera system based on the second visual camera system setting in the real environment.

In some embodiments, the method comprises a step 330 of capturing, from a video capture system, a first video-captured three-dimensional feed of the retail store.

In some embodiments, the method comprises a step 335 of rendering the composite three-dimensional render by processing the second virtually rendered three-dimensional feed and the first video-captured three-dimensional feed.

In some embodiments, the method comprises a step 340 of outputting the composite three-dimensional render to a three-dimensional display.

In some embodiments, the method comprises a step 345 of training an AI system based on the composite three-dimensional render.

The invention claimed is:

1. A method for simulating and generating visual camera views within a virtual rendering system, the method comprising:
   obtaining a first visual camera system setting for a first visual camera system, wherein the first visual camera system comprises a set of visual cameras, wherein the first visual camera system setting comprises number of the set of visual cameras, camera position data, camera orientation, camera movement data and camera lens characteristics data, wherein the first visual camera system setting is determined by a manually designed setting, wherein the first visual camera system setting considers factors that comprise possibility of blind spots, number of cameras that are needed to cover certain points, shop areas that cameras cannot be placed due to physical restriction;
   simulating the virtual rendering system using the first visual camera system setting to correspondingly control the first virtual camera system in a virtual environment, wherein the virtual environment comprises virtual objects corresponding to real objects in a real environment, wherein the real environment is configured to be a retail store;
   obtaining, from the virtual rendering system, a first virtually rendered three-dimensional feed of the virtual environment and the virtual objects using the first virtual camera system;
   tuning the first visual camera system setting to a second visual camera system setting to achieve a second virtually rendered three-dimensional feed of the virtual environment and the virtual objects using the first virtual camera system, wherein the second virtually rendered three-dimensional feed has better coverage and accuracy for the virtual environment and the virtual objects; and
   installing a real-world camera system based on the second visual camera system setting in the real environment.

2. The method for simulating and generating visual camera views within a virtual rendering system of claim 1, wherein physical restriction comprises lamps.

3. A method for simulating and generating visual camera views within a virtual rendering system, the method comprising:
   obtaining a first visual camera system setting for a first visual camera system, wherein the first visual camera system comprises a set of visual cameras, wherein the first visual camera system setting comprises number of the set of visual cameras, camera position data, camera orientation, camera movement data and camera lens characteristics data, wherein the first visual camera system setting is determined by a manually designed setting, wherein the first visual camera system setting considers factors that comprise possibility of blind spots, number of cameras that are needed to cover certain points, shop areas that cameras cannot be placed due to physical restriction;
   simulating the virtual rendering system using the first visual camera system setting to correspondingly control the first virtual camera system in a virtual environment, wherein the virtual environment comprises virtual objects corresponding to real objects in a real environment, wherein the real environment is configured to be a retail store;
   obtaining, from the virtual rendering system, a first virtually rendered three-dimensional feed of the virtual environment and the virtual objects using the first virtual camera system;
   tuning the first visual camera system setting to a second visual camera system setting to achieve a second virtually rendered three-dimensional feed of the virtual environment and the virtual objects using the first virtual camera system, wherein the second virtually rendered three-dimensional feed has better coverage and accuracy for the virtual environment and the virtual objects;
   tuning the second visual camera system setting to a third visual camera system setting to optimize three-dimensional feed of the virtual environment and the virtual objects; and
   installing a real-world camera system based on the third visual camera system setting in the real environment.

4. The method for simulating and generating visual camera views within a virtual rendering system of claim 3, wherein physical restriction comprises lamps.

5. A method for simulating and generating visual camera views within a virtual rendering system, the method comprising:
   obtaining a first visual camera system setting for a first visual camera system, wherein the first visual camera system comprises a set of visual cameras, wherein the first visual camera system setting comprises number of the set of visual cameras, camera position data, camera orientation, camera movement data and camera lens characteristics data, wherein the first visual camera system setting is determined by a manually designed setting, wherein the first visual camera system setting considers factors that comprise possibility of blind spots, number of cameras that are needed to cover certain points, shop areas that cameras cannot be placed due to physical restriction;

simulating the virtual rendering system using the first visual camera system setting to correspondingly control the first virtual camera system in a virtual environment, wherein the virtual environment comprises virtual objects corresponding to real objects in a real environment, wherein the real environment is configured to be a retail store;

obtaining, from the virtual rendering system, a first virtually rendered three-dimensional feed of the virtual environment and the virtual objects using the first virtual camera system;

tuning the first visual camera system setting to a second visual camera system setting to achieve a second virtually rendered three-dimensional feed of the virtual environment and the virtual objects using the first virtual camera system, wherein the second virtually rendered three-dimensional feed has better coverage and accuracy for the virtual environment and the virtual objects;

installing a real-world camera system based on the second visual camera system setting in the real environment;

capturing, from a video capture system, a first video-captured three-dimensional feed of the retail store;

rendering the composite three-dimensional render by processing the second virtually rendered three-dimensional feed and the first video-captured three-dimensional feed;

outputting the composite three-dimensional render to a three-dimensional display; and training an artificial intelligence system based on the composite three-dimensional render.

\* \* \* \* \*